(12) United States Patent
Cheiky (10) Patent No.: US 10,563,143 B2
(45) Date of Patent: Feb. 18, 2020

(54) SYSTEM FOR AUTOMATIC SOLIDS FLOW IN A GASIFIER

(71) Applicant: V-GRID Energy Systems, Camarillo, CA (US)

(72) Inventor: Michael C. Cheiky, Camarillo, CA (US)

(73) Assignee: V-GRID ENERGY SYSTEMS, Camarillo, CA (US)

( * ) Notice: Subject to any disclaimer, the term of this patent is extended or adjusted under 35 U.S.C. 154(b) by 0 days.

(21) Appl. No.: 15/843,412

(22) Filed: Dec. 15, 2017

(65) Prior Publication Data

US 2018/0105758 A1   Apr. 19, 2018

Related U.S. Application Data

(62) Division of application No. 15/019,896, filed on Feb. 9, 2016.

(60) Provisional application No. 62/114,467, filed on Feb. 10, 2015.

(51) Int. Cl.
| | |
|---|---|
| *C10J 3/30* | (2006.01) |
| *C10J 3/32* | (2006.01) |
| *C10J 3/26* | (2006.01) |
| *C10J 3/42* | (2006.01) |
| *C10J 3/72* | (2006.01) |

(52) U.S. Cl.
CPC . *C10J 3/30* (2013.01); *C10J 3/26* (2013.01); *C10J 3/32* (2013.01); *C10J 3/42* (2013.01); *C10J 3/723* (2013.01); *C10J 2300/0916* (2013.01)

(58) Field of Classification Search
CPC .................. C10J 3/30; C10J 3/32; C10J 3/84
See application file for complete search history.

(56) References Cited

U.S. PATENT DOCUMENTS

| | | | |
|---|---|---|---|
| 4,134,738 | A | 1/1979 | Bress et al. |
| 4,153,514 | A | 5/1979 | Garrett et al. |
| 4,583,992 | A | 4/1986 | Rogers |
| 4,652,342 | A | 3/1987 | Kuerston |
| 4,764,184 | A | 8/1988 | Meyer |

(Continued)

OTHER PUBLICATIONS

Patent Cooperation Treaty, International Search Report for PCT/US2016/017389, dated Apr. 21, 2016, pp. 1-3.

*Primary Examiner* — Matthew J Merkling
(74) *Attorney, Agent, or Firm* — Sheppard Mullin Richter & Hampton LLP (57) ABSTRACT

An automated system is described for processing biomass using a series of mechanisms that operate in unison to maintain solids flow through small gasifiers that are otherwise prone to blockage. The system can include: a fixed bed gasifier having upright cylindrical walls defining a biomass gasification chamber therein, the gasifier configured to produce synthesis gas and a carbonaceous product and ash; a device for metering biomass to the gasifier; a device for selectively filtering gasification products; a device for impacting the cylindrical walls with a force; a device for radially mixing carbon in the reduction zone without vertical displacement of gasifier products; one or more material presence sensors which detect the amount and status of biomass within the gasification chamber; and a processor system which takes input from material presence sensor and activates one or more of said devices.

7 Claims, 13 Drawing Sheets

(56) References Cited

U.S. PATENT DOCUMENTS

| | | |
|---|---|---|
| 5,230,716 A | 7/1993 | Notestein |
| 8,192,514 B2 | 6/2012 | Stadler et al. |
| 2007/0006528 A1 | 1/2007 | Diebold et al. |
| 2008/0134581 A1 | 6/2008 | Van Dyk et al. |
| 2011/0072722 A1 | 3/2011 | Young et al. |
| 2012/0110896 A1 | 5/2012 | Coronella et al. |
| 2013/0232873 A1* | 9/2013 | DePuy ..................... C10J 3/26 48/87 |
| 2014/0183022 A1 | 7/2014 | Daugaard et al. |

\* cited by examiner

SYSTEM FOR AUTOMATIC SOLIDS FLOW IN A GASIFIER

CROSS-REFERENCE TO RELATED APPLICATIONS

This application is a divisional of U.S. patent application Ser. No. 15/019,896, filed Feb. 9, 2016, which claims priority to U.S. Provisional Patent Application Ser. No. 62/114,467, filed Feb. 10, 2015, the contents of which are incorporated herein by reference in their entireties.

FIELD OF THE DISCLOSURE

The disclosure broadly relates to biomass gasification, and more particularly, to a method and system for managing solids flow in a gasifier, specifically fixed bed gasifiers such as downdraft, updraft or crossdraft gasifiers, by automatic equipment.

BACKGROUND OF THE DISCLOSURE

Gasification can convert carbon-containing materials to useful chemical products. These chemical products typically involve synthesis gas (syngas), which can be combusted to produce electricity, or chemically reacted to produce oxygenates or hydrocarbons in catalytic systems. The most common form of gasification in large scale industry is coal gasification, which is practiced on a worldwide basis, most notably by electricity producing power plants. Coal is delivered via gravity methods or via a slurry, and solids flow is not an issue at large scales. On the other hand, gasification using biomass is desirable from the point of view of decreasing greenhouse emissions, as biomass use is essentially a carbon neutral process if all the biomass is used, and can be a carbon negative process if some carbon is sequestered. Biomass use also reduces a country's dependence on fossil fuels. Due to its portability and widespread availability, biomass is used extensively in small scale gasification systems. The most common method for managing the flow of biomass through gasification systems utilizes gravity drop equipment. Major challenges with biomass flow in gasifiers include removing bridging within the gasifier, along with the need to manually shake and jiggle the biomass within the gasifier to remove jams. The clearing often necessitates stopping the gasifier, incurring a double cost of lost production and labor costs for the personnel tasked with the clearing. Clinker formation is also a problem as a result of non-uniform solids flow. In one instance, a biomass gasifier manual encourages the user to manually shake the grate vigorously with a grate shaking rod to clear them.

Prior art methods for managing solids flow in gasifier include a rotatable grate feature in U.S. Pat. No. 5,192,514 issued to Sasol, Inc. applicable to a fixed bed coal gasifier. In this gasifier configuration, coal flow is controlled via a coal lock. A rotatable grate mechanism at the bottom of the gasifier is rotatable about the vertical axis of the ash discharge outlet, and includes at least one upwardly projecting finger or disturbing formation, to disturb the ash bed formed in use above and around the rotatable grate, when the grate is rotated.

U.S. Pat. No. 5,230,716 issued to US Department of Energy discloses a rotating conical grate assembly which crushes agglomerates of clinkers at the bottom of a fixed bed gasifier by pinching them between stationary bars and angled bars on the surface of the rotating conical assembly. U.S. Pat. No. 4,764,184 teaches a rotating grate with scraping blades. U.S. Pat. No. 4,652,342 teaches a motor driven anti-bridging mechanical agitator having a crankshaft. The agitator is comprised of pushrods having scoop arms, the pushrods are driven in a reciprocating manner upwards and downwards via the crankshaft. U.S. Pat. No. 4,134,738 discloses a poking system comprising a retractable pokerod assembly used to agitate a coal bed and having means for temperature sensing clinker formation, and position sensing relative to the housing which are used to determine the frequency and extent of the actuation of the pokerod assembly. U.S. Pat. No. 4,853,992 discloses a biomass gasifier which uses a rotatable grate in conjunction with stationary bars above the grate to shear large charcoal particles so that they may be channeled through the grate.

Bridging can be a more significant issue in biomass gasifiers than in those operating with coal. Biomass undergoes significant changes in particle size and density as it traverses a gasifier, transforming to materials possessing different physical properties and different flow characteristics in the distinct drying, pyrolysis, combustion, and gasification zones. Excessive tar buildup can lead to a coating on the biomass which acts as an effective bridge between biomass particles. When this coating precipitously reaches the combustion zone, a rapid highly exothermic event can occur which destroys the zone architecture. In gasifiers that are run in conjunction with an engine, bridging can have deleterious effects on engine operation if synthesis gas is not supplied at a constant rate.

SUMMARY OF THE DISCLOSURE

Embodiments of the present disclosure are directed toward methods for preventing biomass and charcoal bridging by automating solid flow of feed material and gasification products in a fixed bed gasifier. These methods are applicable to a wide range of biomass materials and wide range of moisture levels. Constant feed rate through the gasifier is desired without logjams or congestion points. Processes are provided for clearing logjams and congestion as input biomass is converted to char or ash in vertical column gasifiers. Some methods use aliquot metering of biomass regulated by feedback from material presence sensors that monitor the extent of combustion of biomass in the gasifier. Other methods use processes to disturb solids in a radial direction without significantly disturbing the solids in the vertical direction. These methods destroy bridging without mixing combustible material with hot char. Other methods rely on shocks to shake material to assure continued movement. In some embodiments, this shock method is linked to a grate rotation to dislodge bridge particles. Still other methods use size selectivity of material as the material is reduced in size through the various stages of the gasifier, resulting in a uniform or semi-uniform product flow. Additional agitation methods also include methods for vibrationally exciting the gasifier walls and the material within.

A specific implementation of these various methods is disclosed. Aliquot distribution is implemented via intake augers that receive feedback from various material presence sensors and outtake augers that remove material once it is fully processed. The radial mixing without vertical displacement method is implemented via a shaft that is attached an auger having a large void volume and which is inserted into the reduction regime to radially mix the material in this region. Size selectivity is implemented via an adjustable grate assembly that varies its opening depending on particle size and interactively responds to solids flow through the gasifier. This is useful particularly for passing through certain types of particles, such as biochar particles. The implementation of shock-induced displacement method relies on a rotatable grate assembly that is actuated by hammer-like impacts that impinge on the grate assembly. Vibration excitation of gasifier walls is achieved via a vibrating motor attached to the gasifier walls. These embodiments are anti jamming methods which use inputs from sensors within the gasifier. In some embodiments, the gasifier is selected from downdraft, updraft or co-current gasifiers.

The full nature of the advantages of the disclosure will become more evident from the following detailed description.

BRIEF DESCRIPTION OF THE DRAWINGS

Certain embodiments of the present disclosure will hereinafter be described in detail, by way of example only, with reference to the accompanying drawings, in which:

FIG. 6A and FIG. 6B are cross-sectional views showing implementation of a mixing device which performs radial displacement with little vertical displacement, the mixing device comprising a retractable shaft welded to a thin auger. FIG. 6A shows the mixing device in a resting position, while FIG. 6B shows the device in a fully extended position.

The figures are not intended to be exhaustive or to limit the disclosure to the precise form disclosed. It should be understood that the disclosure can be practiced with modification and alteration, and that the disclosure be limited only by the claims and the equivalents thereof.

DETAILED DESCRIPTION

In the following paragraphs, embodiments of the present disclosure will be described in detail by way of example with reference to the attached drawings. Throughout this description, the preferred embodiment and examples shown should be considered as exemplars, rather than as limitations on the present disclosure. As used herein, the "present disclosure" refers to any one of the embodiments of the disclosure described herein, and any equivalents. Furthermore, reference to various feature(s) of the "present disclosure" throughout this document does not mean that all claimed embodiments or methods must include the referenced feature(s).

Figure 1:
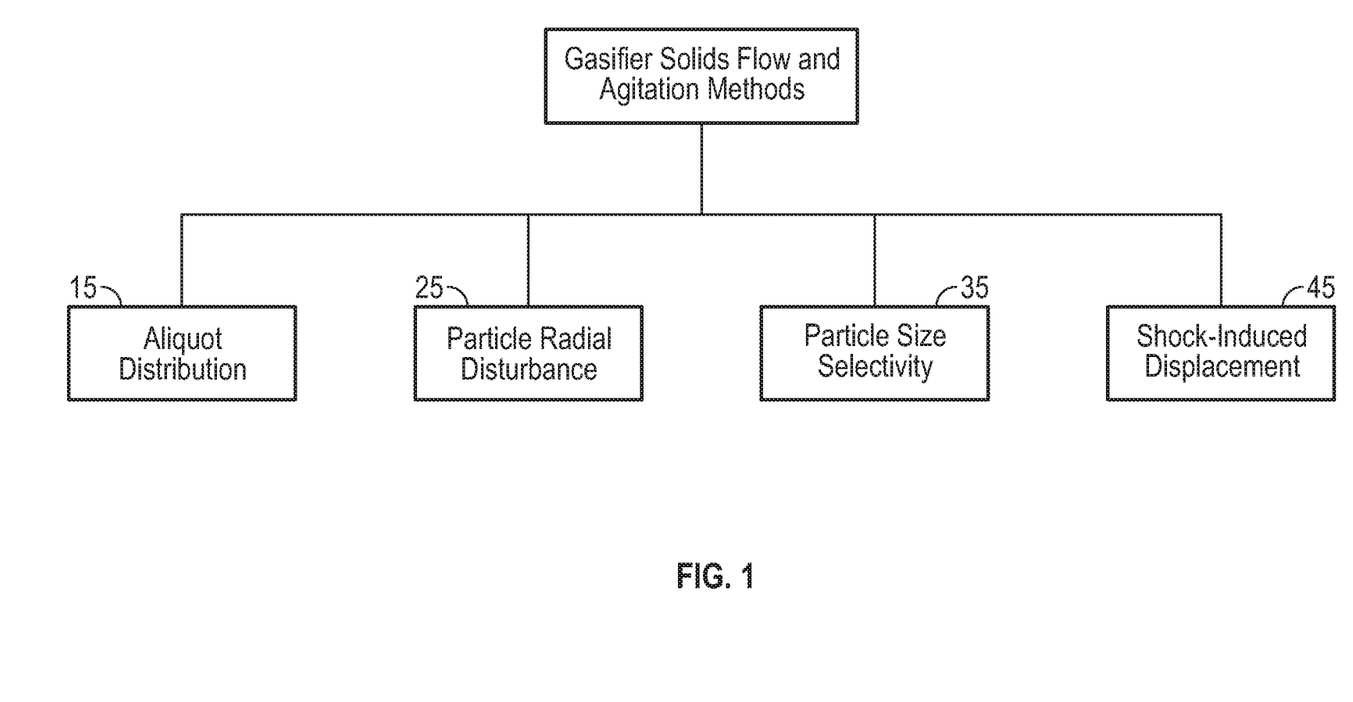
FIG. 1 is a diagram illustrating the various methods for preventing biomass and charcoal bridging, as set forth herein.

Embodiments of the disclosure utilize various processes and agitation methods for facilitating the flow of solids through a gasifier. In its most basic form the present invention provides for a gasifier connected to an input reservoir, grate mechanism within gasification chamber connected to an exit reservoir, material presence sensors which detect the amount and state of biomass within the gasifier, and anti jamming mechanisms to automatically clear jams using inputs from the material presence sensors. FIG. 1 provides a list of solid flow processes and agitation methods (i.e. anti jamming mechanisms) incorporated in the present disclosure which, separately or in combination, constitute a novel method for processing solids through a gasifier. This disclosure is applicable to any vertical gasifier relying on gravity for its operation, including counter-current, current, or co-current fixed bed gasifiers, also termed downdraft, updraft and entrained flow gasifiers. The agitation and transport methods provided in FIG. 1 transfer solids through a gasifier as material is transformed from raw form to ultimately, a carbonaceous product, ash and product gas, also referred as synthesis gas.

The raw form input is a biomass input, a term for the biodegradable fraction of agricultural products, residual or not, forestry products, industrial or municipal solid waste. Biomass generally refers to material originating from plant matter, in particular material containing cellulose, hemicellulose, lignins, lignocellulosic polymers, and extractives as composition. Forest products refers may refer to forest residue, wood pellets, wood shavings, bark, peat, waste wood, energy crops, virgin wood, recycled wood, sludge, sawdust, wood chips, as well as black liquor and other products derived from pulp and paper operations. Biomass may also refer to herbaceous material such as miscanthus, rice husk, straw, and sorghum as well as waste edible materials such as seeds and grains. Biomass may also refer to animal derived products such as manure. The term may also be used for a mixture of one or more of the above.

As the input material flows through a gasifier, it experiences several processes, including drying, pyrolysis, partial combustion and, finally, char gasification. At each of these stages, material properties change, either as density changes or chemical transformations, and there is a consequent need to process material of differing properties. Conventional methods primarily use gravity to direct material flow with no direct intervention or intervention methods that are quite different from those described herein. The active approach of the present disclosure as shown in FIG. 1 comprises at least one of: (i) method 15 which comprises an aliquot or batch method for processing solids flow through the gasifier; (ii) method 25 that utilizes material radial mixing without vertical displacement; (iii) method 35 that utilizes size particle selectivity for processing solids flow; and (iv) method 45 which uses a shock technique onto a grate assembly to effect material agitation. These anti jamming methods may be used separately or in combination, and in particular sequences, to effect optimal particle transfer.

Figure 2:
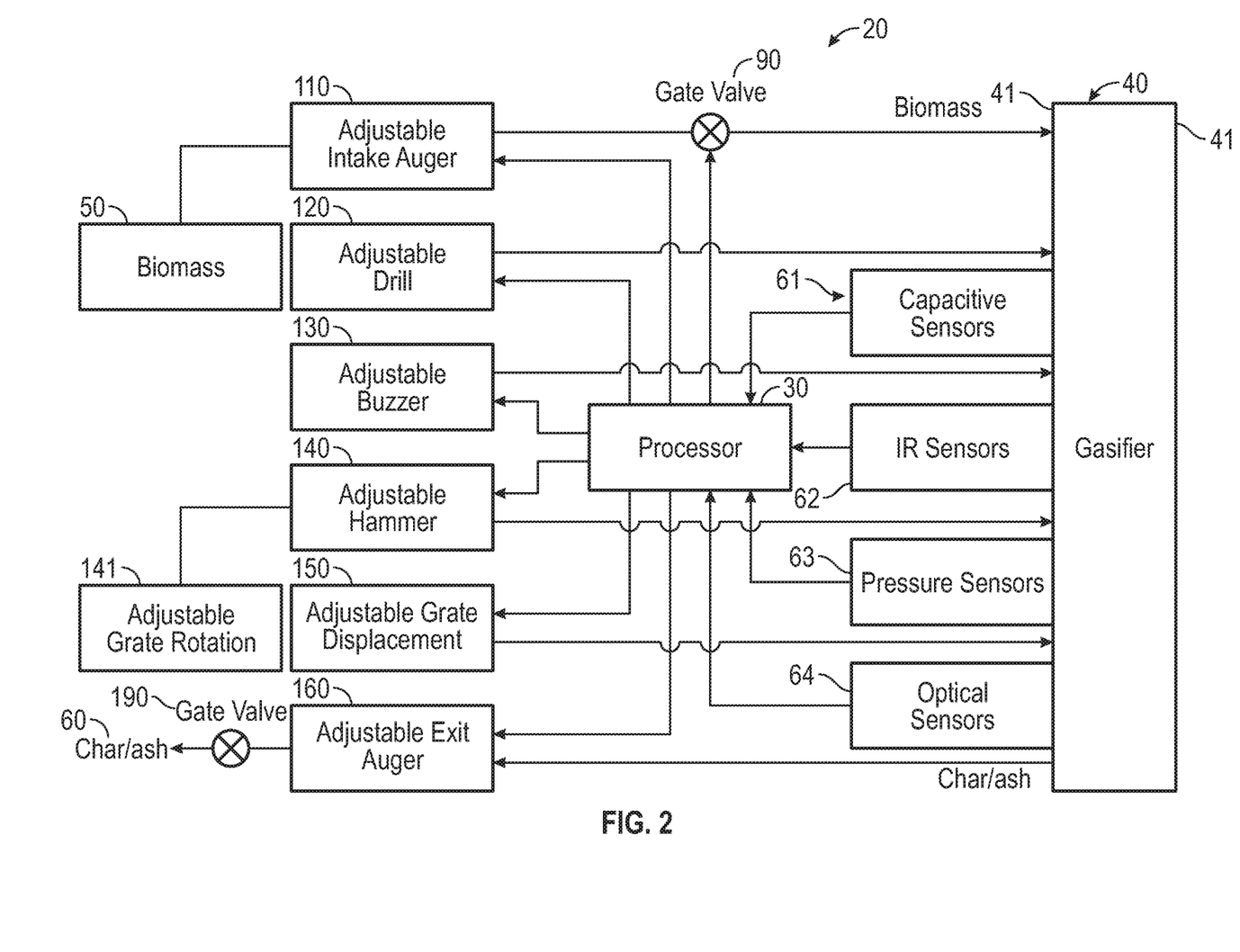
FIG. 2 is a diagram illustrating a system configured to implement the various methods for preventing biomass and charcoal bridging, as set forth herein.

An implementation of these methods in a gasifier system is shown in FIG. 2. Specifically, gasifier system 20 processes biomass 50 at one end of gasifier 40 and outputs char/ash 60 at the other end. Gasifier 40 has upright cylindrical walls 41 defining a biomass gasification chamber within, and has material presence sensors 61, 62, 63 and 64 attached to or within the walls that provide feedback on solids flow through the gasifier. Feedback information is fed to a processor 30 that controls the inflow system 110, outflow system 160, and agitation devices 120, 130, 140, 141 and size selection device 150.

Figure 3:
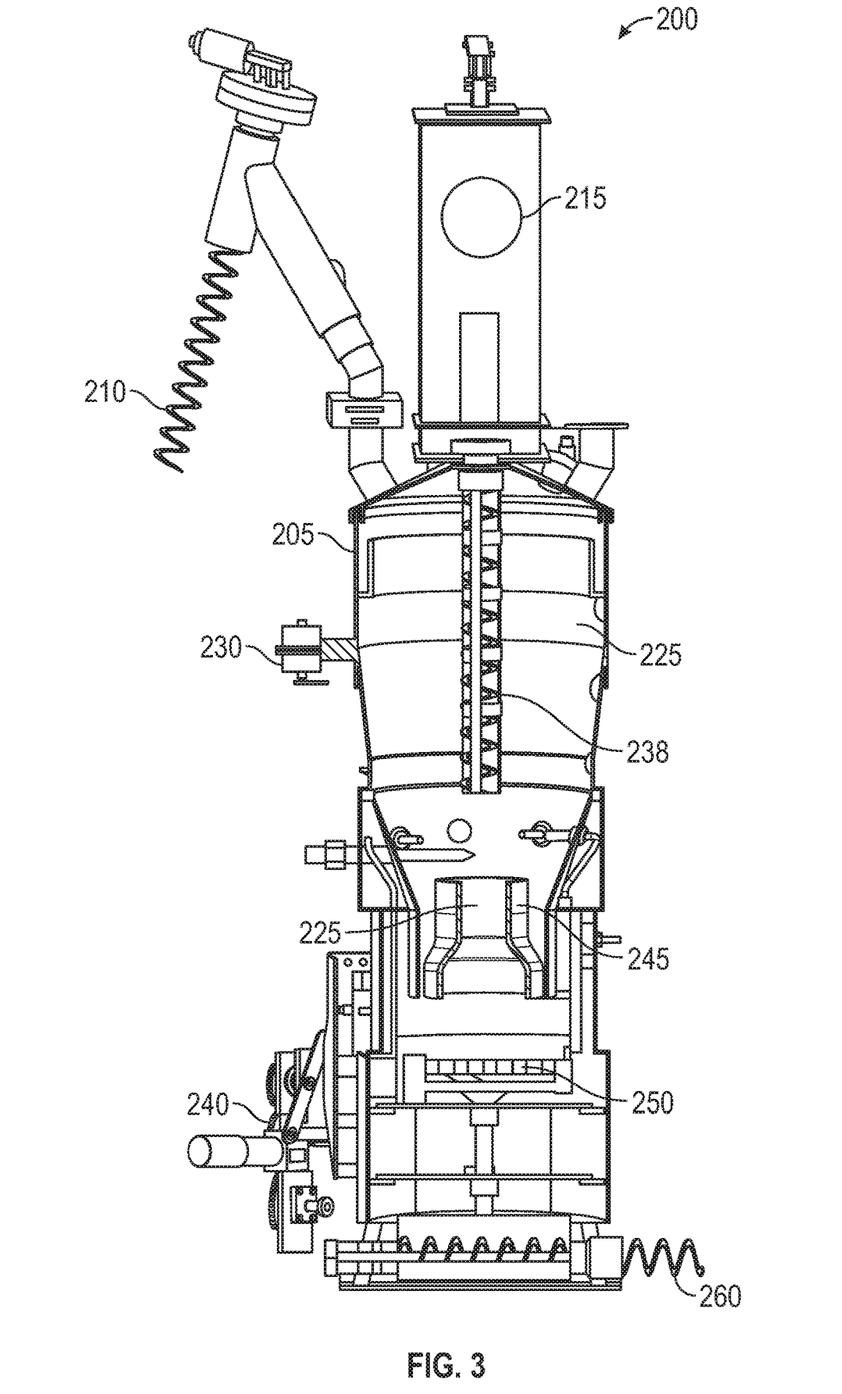
FIG. 3 is a cross-sectional view illustrating a physical arrangement of gasifier elements in FIG. 2.

FIG. 3 is a cross-sectional view illustrating a physical arrangement of gasifier elements in FIG. 2. Specifically, FIG. 3 shows a three dimensional drawing of intake/outtake devices 210 and 260, and agitation devices 230, 238, 240, and 250 incorporated in a downdraft gasifier system 200. System 200 has an intake auger 210 with gate valve that removes biomass from a reservoir (not shown). This biomass feeds into gasification chamber 225 that fills up to a preset level monitored by material presence sensor such as optical sensor or infrared sensors located within the chamber. The metered insertion of material implements aliquot distribution method 15.

As the gasification process proceeds several zones of drying, pyrolysis, partial combustion and gasification are established. Agitation device 238 implementing method 25 is actuated by assembly 215 and is used to radially mix the gasification zone without disturbing the biomass, pyrolysis, or combustion zones. Agitation device 238 comprises a retractable shaft welded to an auger with large void volume. As material is gasified, it builds up a layer of char and ash. Depending on extent of gasification, material passes through displaceable grate assembly 250, which is an implementation of method 35. An agitation device 240 implementing method 45 is attached to grate assembly 250 and enables the transmission of hammer like impacts upon gasifier walls. This agitation device 240 also enables rotation of grate assembly 250. Material exits through outflow assembly 260 which incorporates one or two gate valves and also implements aliquot method 15. The components of this implementation by reference of the particular method represented will now be described.

Aliquot distribution method 15 comprises dispensing and removing metered amounts of material from the gasifier. Input biomass is dispensed into the gasifier using feedback from material presence sensors providing information on the amount and state of matter inside the gasifier. The material presence sensors provide input on such properties as the biomass fill level, biomass composition, biomass density and gasifier temperature and pressure. These material presence sensors can include capacitive sensors, mechanical displacement sensors, optical sensors, ultrasound sensors, infrared sensors, microwave sensors, X-ray sensors, thermal sensors, and pressure sensors providing input fed to a processor in order to facilitate material flow-thorough. Material is removed from a reservoir container system and deposited into the gasifier by various techniques, such as auger or belt transport, based on material presence sensor input identifying a need for more material. The reservoir system stores a volume of material that is significantly more than the amount of material in the gasifier at any one time. The advantage of this method is that it decouples the solids flow inside the gasifier from the input or output flow. An implementation of this method is shown in FIG. 4 and FIG. 5.

Figure 4:
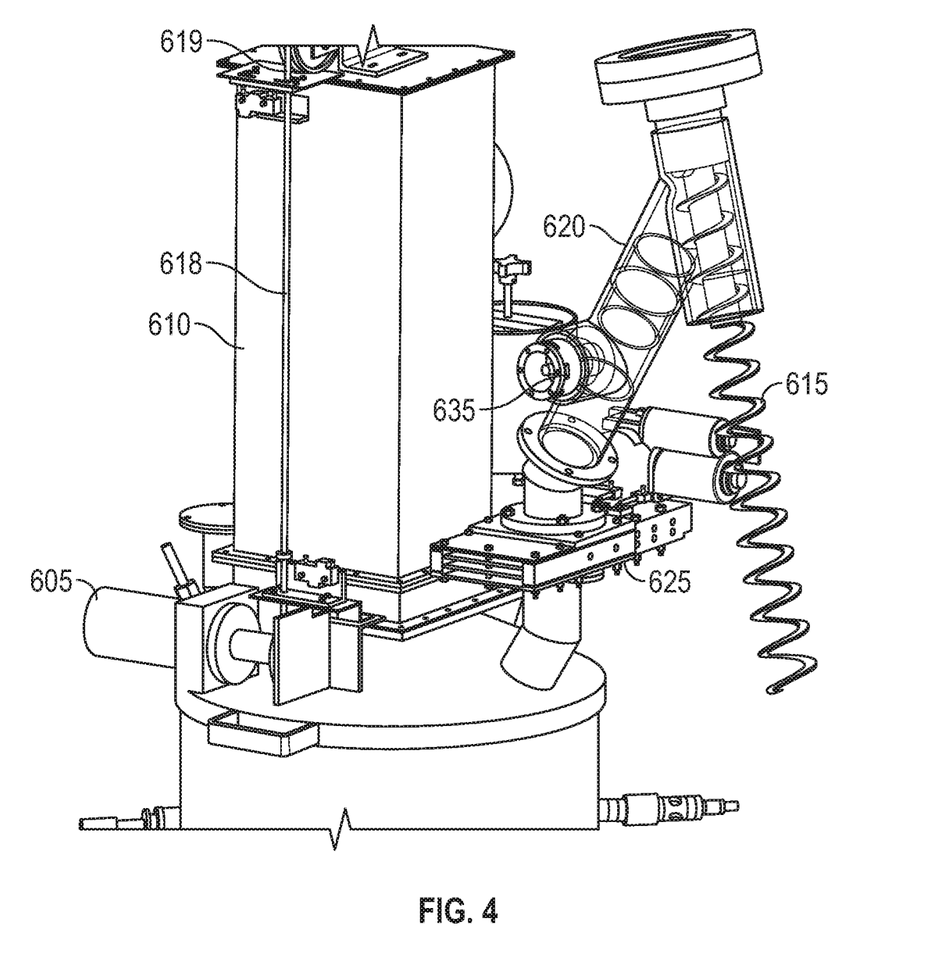
FIG. 4 is a perspective view showing an adjustable intake auger and valve component which directs biomass in flow to the gasifier, and is a component of the metered deposition method of the disclosure.
Figure 5:
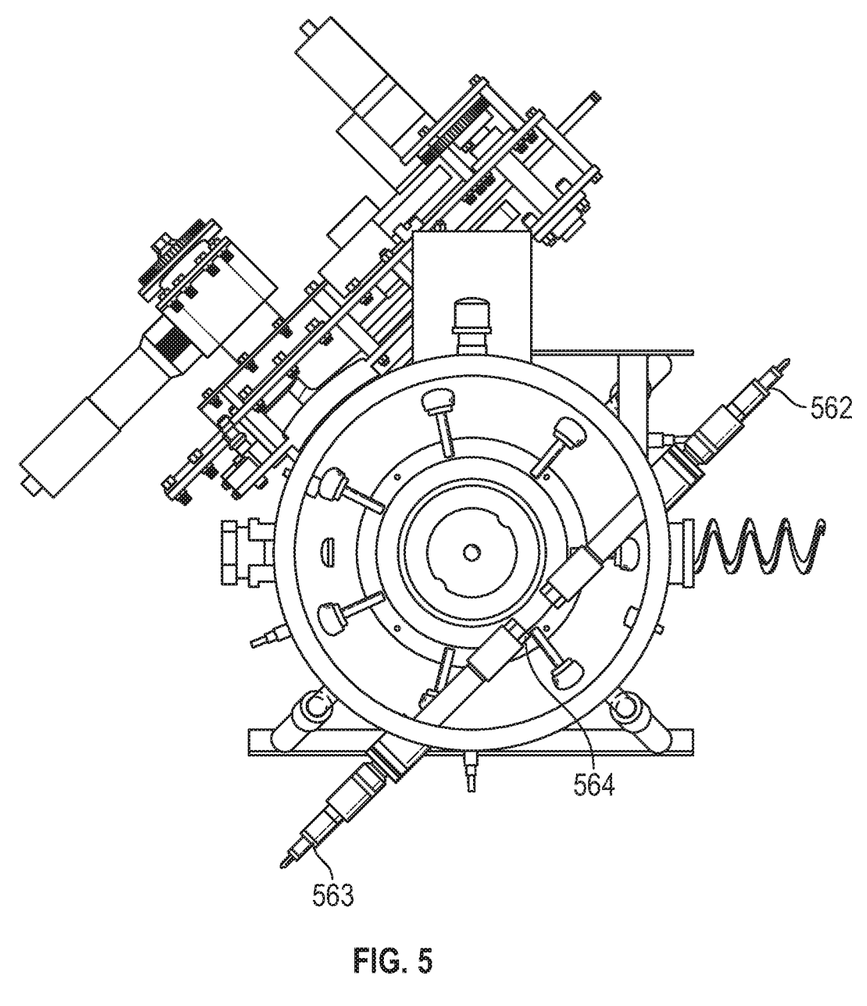
FIG. 5 is a top view illustrating the material presence sensor assembly used in the metering deposition method.

Referring to FIG. 4, input biomass is conveyed through auger 615 to tubular container 620 which is intercepted by gate valve 625. This valve is a loadlock that opens to admit material in, but otherwise remains closed to exclude oxygen from the top of the gasifier. Optionally, a material presence sensor such as capacitive sensor 635 is provided to detect the presence or absence of biomass in tubular container 620. The biomass fill level in the gasifier chamber is monitored by material presence sensors such as optical or infrared sensors 562, 563 (FIG. 5) which detect the presence of biomass indirectly (even in the presence of smoke) whenever sensor tip 564 is blocked. There may be a plurality of these sensors in the gasifier to gauge the fill level at several points.

Figure 6A:
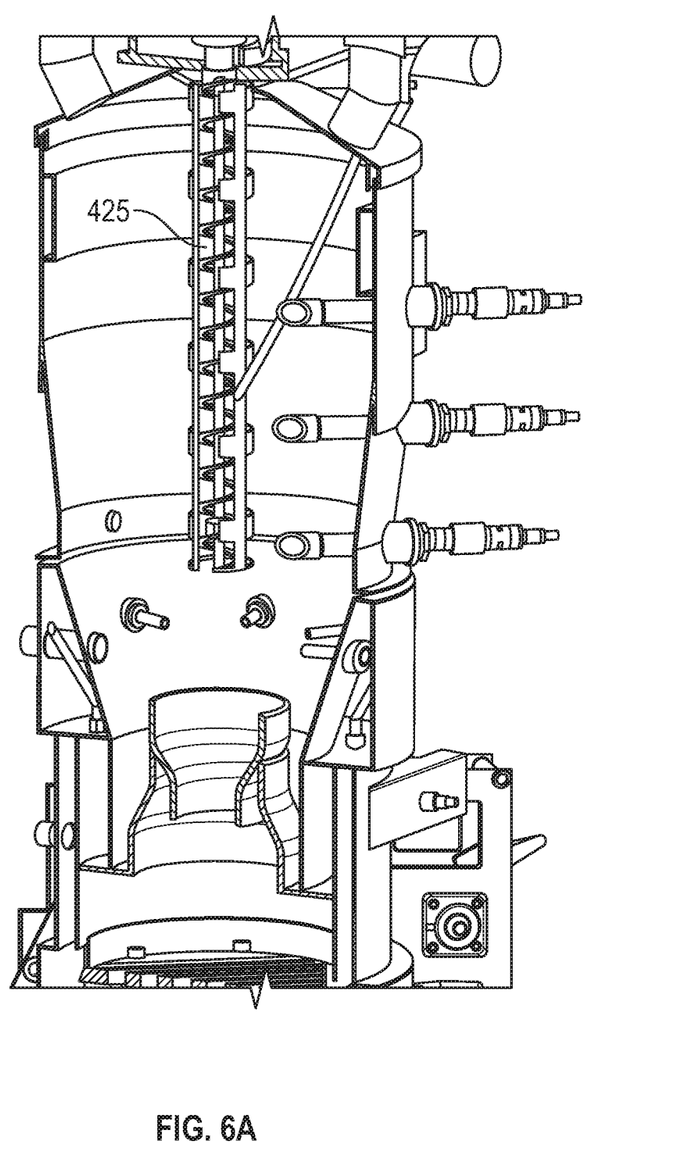
Figure 6B:
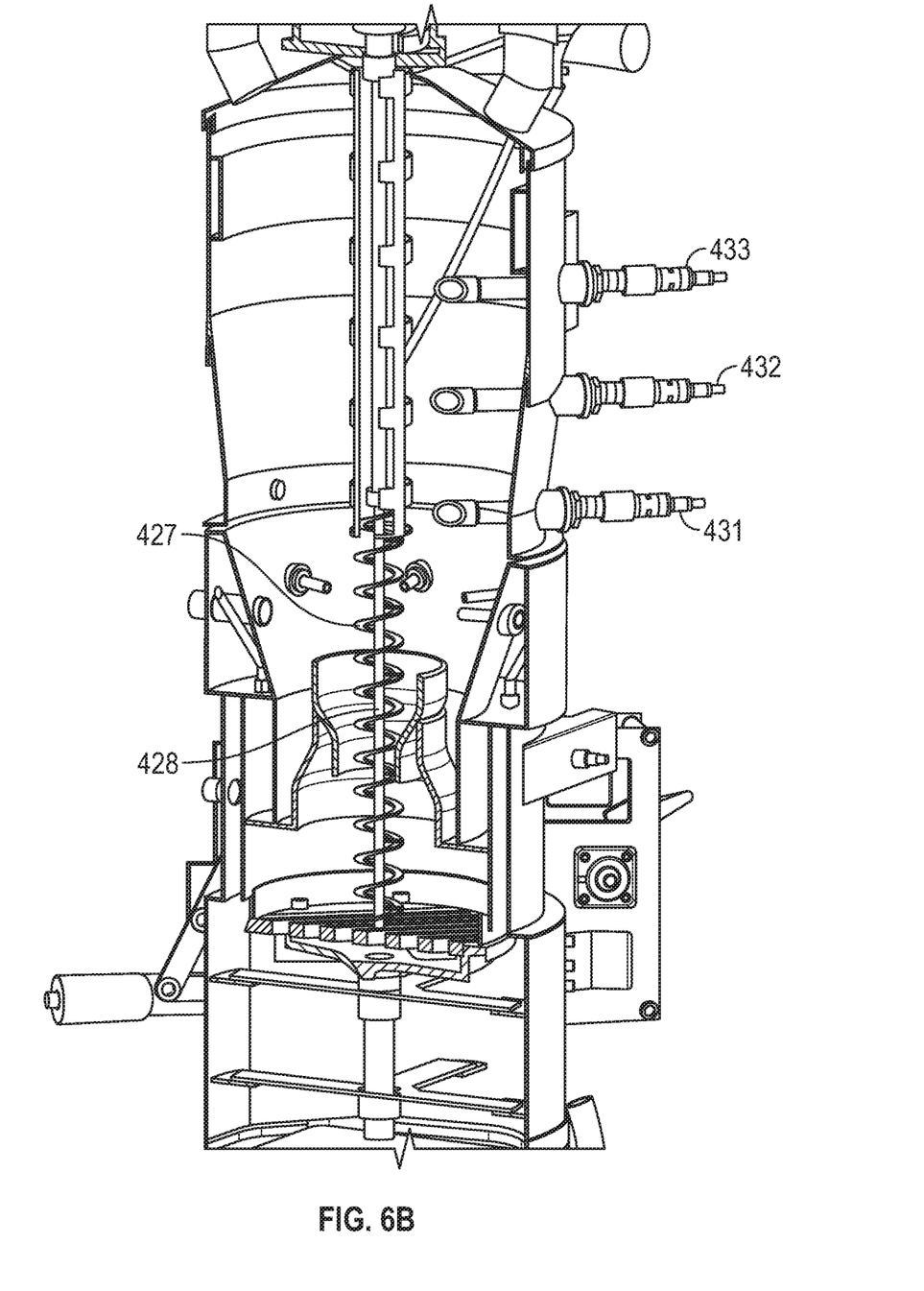

FIG. 6B shows an embodiment with 3 material presence sensors, in which the lowest placed sensor 431 is activated under normal loads. When the biomass fill level is below this level, auger 615 is activated to input biomass until sensor 432 is activated, at which point the auger stops until sensor 431 is again activated. Sensor 433 can be used as a sensor that acts as an additional alarm. In this manner a consistent load is maintained. An additional advantage provided by this method is that multiple feeds are allowed at the same time. Thus different biomass feedstocks can be fed to the gasifier without affecting performance, due to the decoupling of the feed system to the gasification flow through.

Figures 6C, 6D:
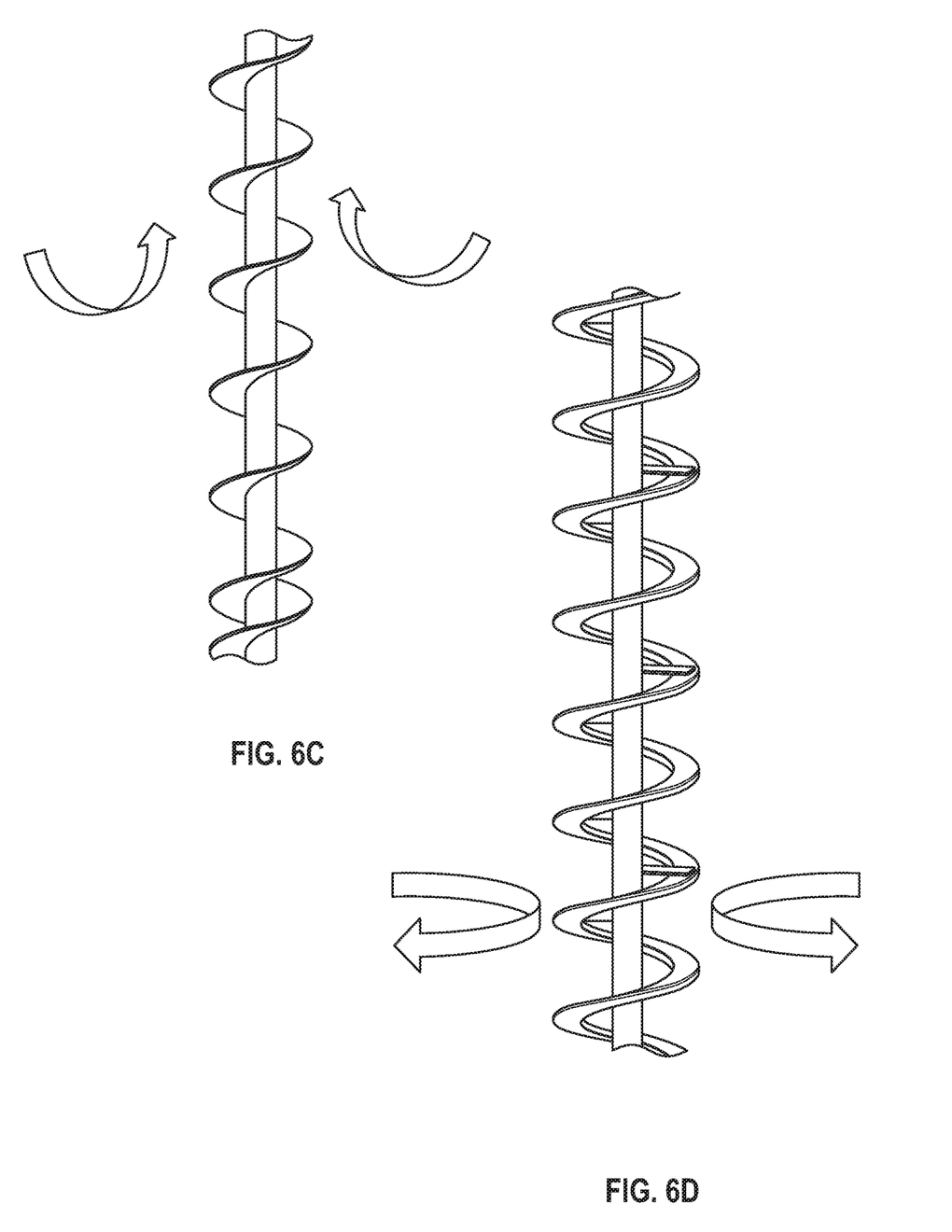
FIG. 6C shows the mixing action of typical auger prior art.
FIG. 6D shows mixing action enable by the present invention.

The radial mixing without vertical displacement method 25 exerts minimal disturbance of the drying, pyrolysis, and combustion zones, while effecting radial mixing in the reduction zone. This is important for preventing premature mixing of the zones, as such a mixture can result in an explosive event. In a typical auger drilling operation, the rotation of the blade causes material to be removed out and upward of the hole being drilled. (See FIG. 6C). In a gasifier with multiple zones, this simple drilling, while destroying bridging, would result upon retraction of the auger in a conduit which would allow hot gases to escape to the feed zone, leading to premature combustion. By contrast, the disclosed method destroys bridging without destroying gasifier performance. The method is implemented by agitation device 238 which comprises, as shown in FIG. 6B, open guide tube 425, solid shaft 428, and flattened wire 427 which spirals around solid shaft 428. Shaft 428 is attached or welded to wire 427 only at select shaft protrusions, leaving significant void space between the shaft and the wire. This void space enables the assembly to be retracted while rotating in such a way that it does not remove material or intermix material between each zone. The void space also allows material to be radially mixed whenever the shaft rotates, thereby breaking the tar interface causing bridging. Material is stirred around, not up, as the drill rotates. The two extremes of position for the retractable assembly are shown in FIGS. 6A and 6B, and FIG. 6D shows the particle movement enabled by the present invention in contrast to the upward particle shown in FIG. 6C for typical augers. Shaft 428 is driven by motor 605 via linkage 618. as shown in FIG. 4. Sealed housing 610 sits on top of the gasifier and is tall enough to provide room for the required vertical range of motion of agitation device 238.

Figure 7:
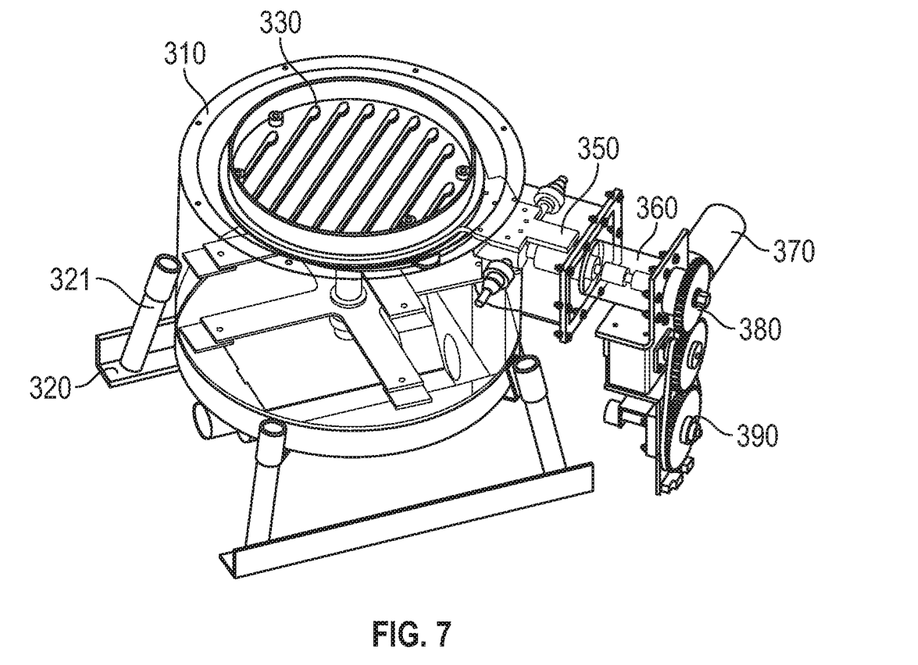
FIG. 7 is a perspective view depicting a grate assembly which is an implementation of a particle size selectivity method and a shock-induced displacement method of material within a gasifier.

The solids flow method 35 uses particle size discrimination in processing material through the gasifier. This method selectively passes particles of a size or structure, such as ash or char particles, through an adjustable grate assembly and deters large size particles from passing through. The particle discrimination can be effected via different ways, such as a variable sieve assembly, a variable grate assembly, or other means able to control orifice dimensions for material exiting the gasifier. This particle discrimination allows control of material residence in the reduction zone, and can be used to control the ratio of carbonaceous material to syngas production. An implementation of this method is embodied in the variable grate assembly shown in FIG. 7. A grate 330 with horizontal slots is housed near the bottom of gasifier standing on base 320 with legs 321. Grate 330 sits on top of a similarly constructed grate (not shown) and is displaced relative to the bottom grate by servo mechanical means comprising motor 370, gears 380 and 390, and plunger 360.

Figure 8A:
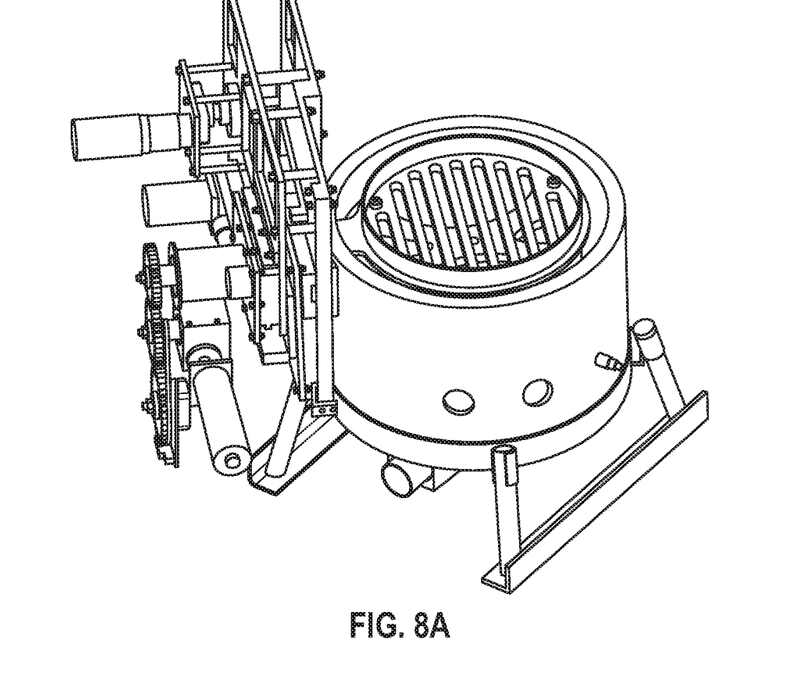
FIGS. 8A and 8B are perspective views showing, respectively, completely open and completely closed grate positions achievable by servo control in the grate assembly.
Figure 8B:
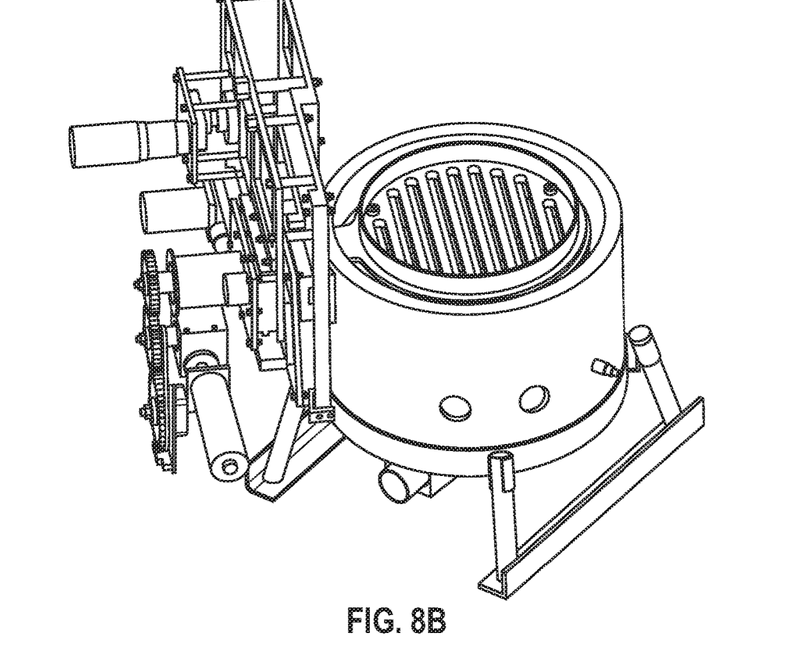

FIGS. 8A and 8B are perspective views showing grate positions achievable by servo control in the grate assembly. In particular, FIG. 8A and FIG. 8B show the full range of relative motion of the grate assembly, wherein FIG. 8A depicts a fully open grate assembly which allows larger particle exit, while FIG. 8B depicts a minimally open grate assembly which preferentially admits fine particles.

Figure 9:
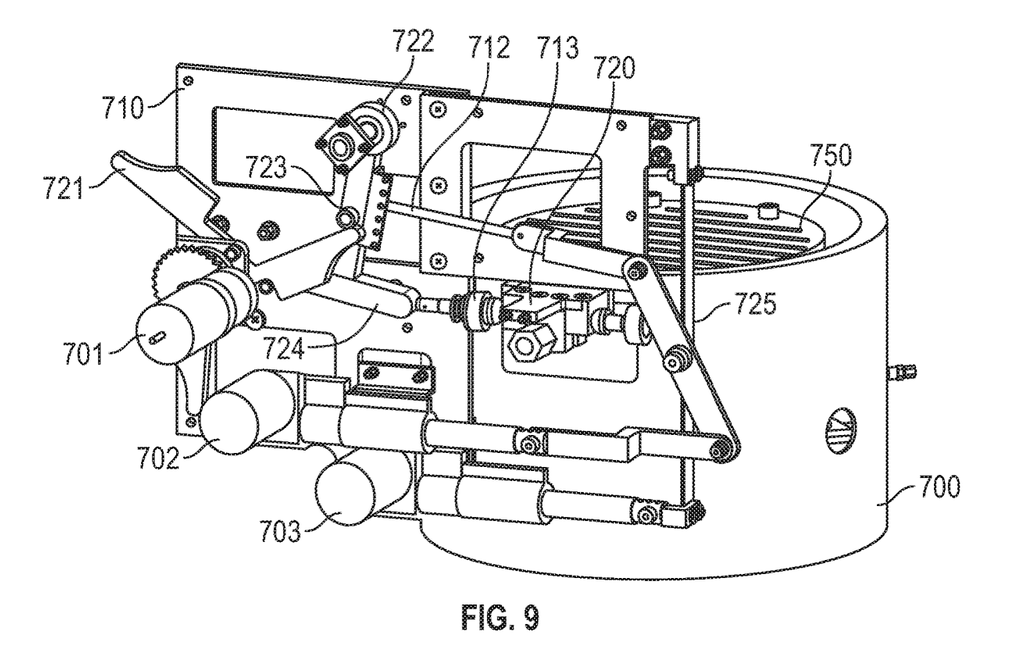
FIG. 9 is a perspective view depicting a device that implements shock-induced displacement in a gasifier.
Figure 10A:
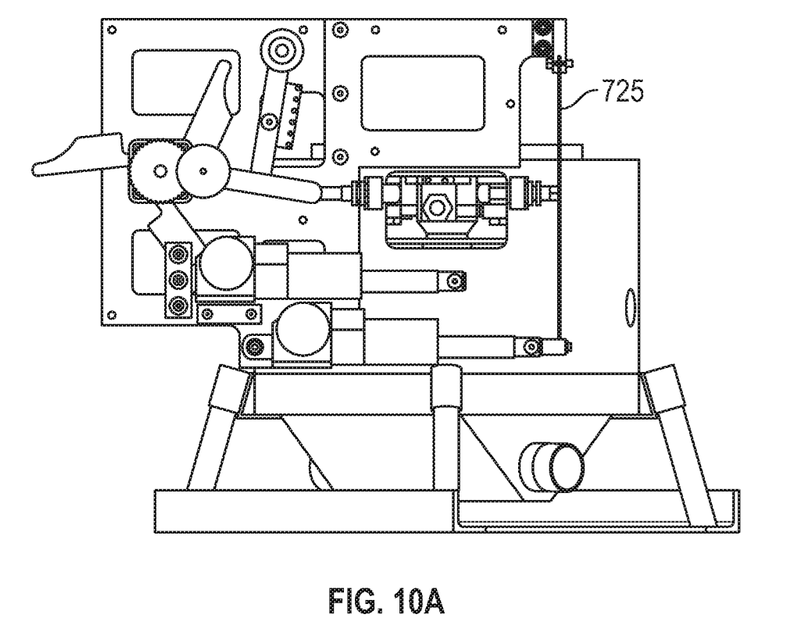
FIGS. 10A and 10B are plan views showing the different positions of a tensioner belt in a shock-induced displacement device.
Figure 10B:
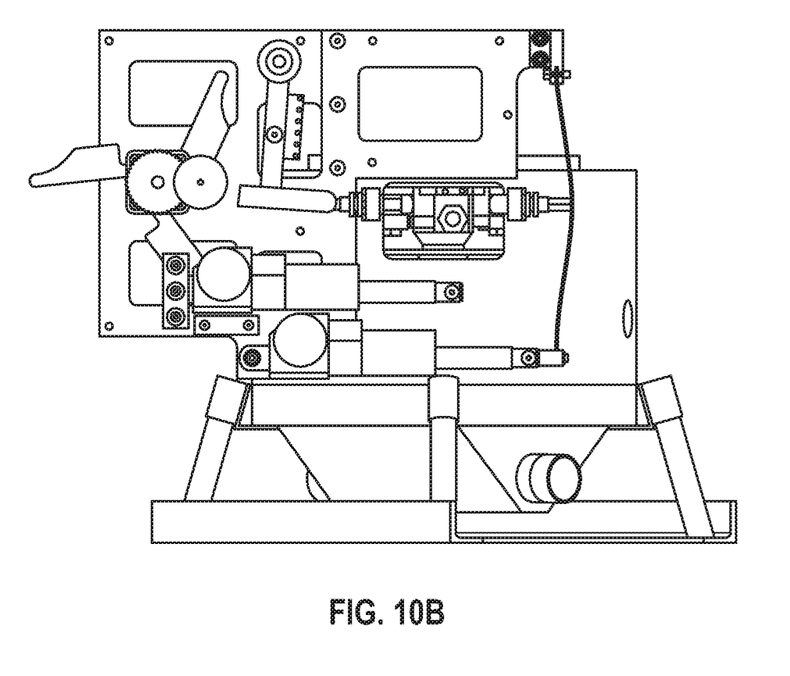
Figure 10C:
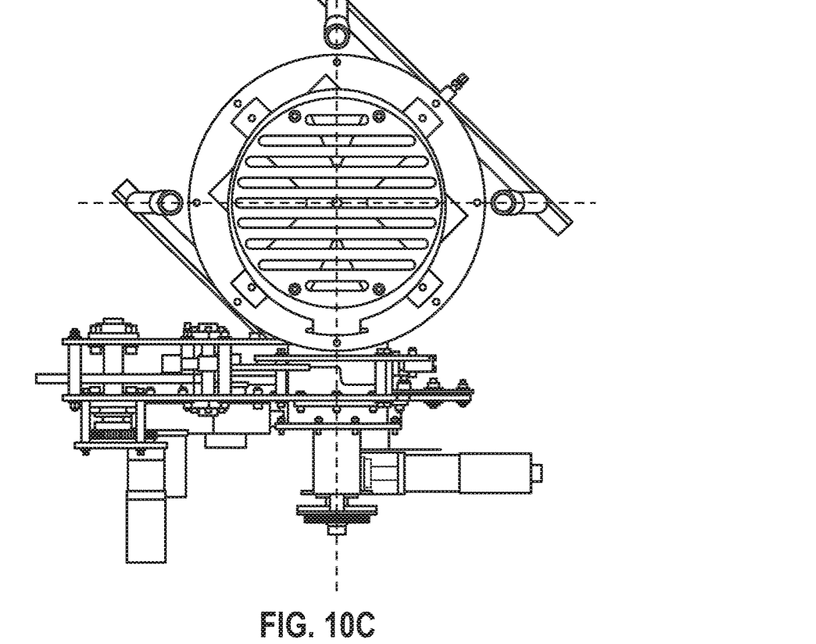
FIG. 10C and FIG. 10D are corresponding top views, indicating rotation of grate by angle φ about a center axis.
Figure 10D:
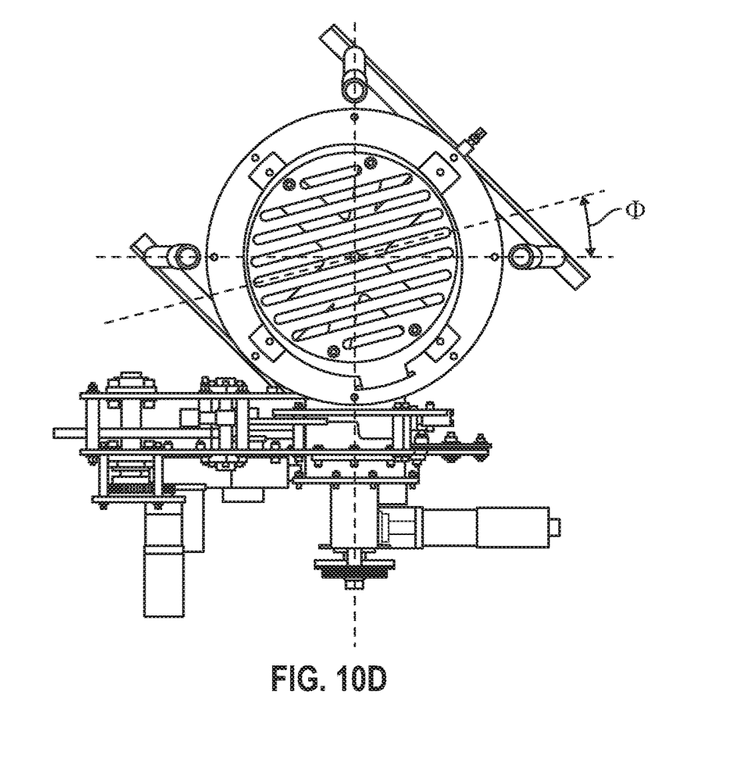

The shock-prompted agitation method 45 is another method to break bridging that relies on hammer-like impacts to dislodge particles. This method may be combined with a method that rotates the grate mechanism, as shown in an implementation in FIG. 9, which shows an embodiment using a cam driven grate assembly. With reference to FIG. 9, cam 721 is driven by motor 701 and contacts cam follower 723 located on weight arm 722. As the cam rotates it lifts the follower and weight arm against resistance provided by spring 712 whose resistance is regulated by motor 702. As the cam rotates, the cam clears the follower and extension arm 724 impacts the plunger 713 which in turn imparts energy to the protruding arm 720 of rotatable grate 750. On the opposing side of the protruding arm is another plunger which experiences a belt tension supplied by belt 725 and regulated by motor 703. An illustration of the assembly range of motions is shown in FIGS. 10A, 10B, 10C and 10D. FIG. 10A shows a belt in a relaxed position with the grate in an un-rotated state. In FIG. 10B, arm extension 722 has impacted the plunger, causing the grate to rotate about its principal axis and the opposing plunger to exert a force on belt 725, as shown by deflection of the belt. Corresponding top views are shown in FIG. 10C and FIG. 10D, with FIG. 10D indicating a grate rotation by angle $\phi$ about the center gasifier axis, compared to FIG. 10C, which shows no rotation. The shock displacement method my be used in combination with the grate selectivity method to optimal particle flow. In the case of a fine powder biomass, for example, an approach utilizing high g-forces combined with restricted grate opening is preferable, whereas for large biomass particles such as walnut shells, a low g-force rocking motion in combination with wide grate opening would be optimal.

An additional anti jamming method which comprises the present disclosure is vibrational excitation of gasifier walls. This method is implemented, as shown in FIG. 3, via device 230 which comprises a small weight attached to a motor, in which the weight rotates off axis the principal motor rotation. This additional feature is particularly useful for removing bridging caused by very fine particles.

Figure 11A:
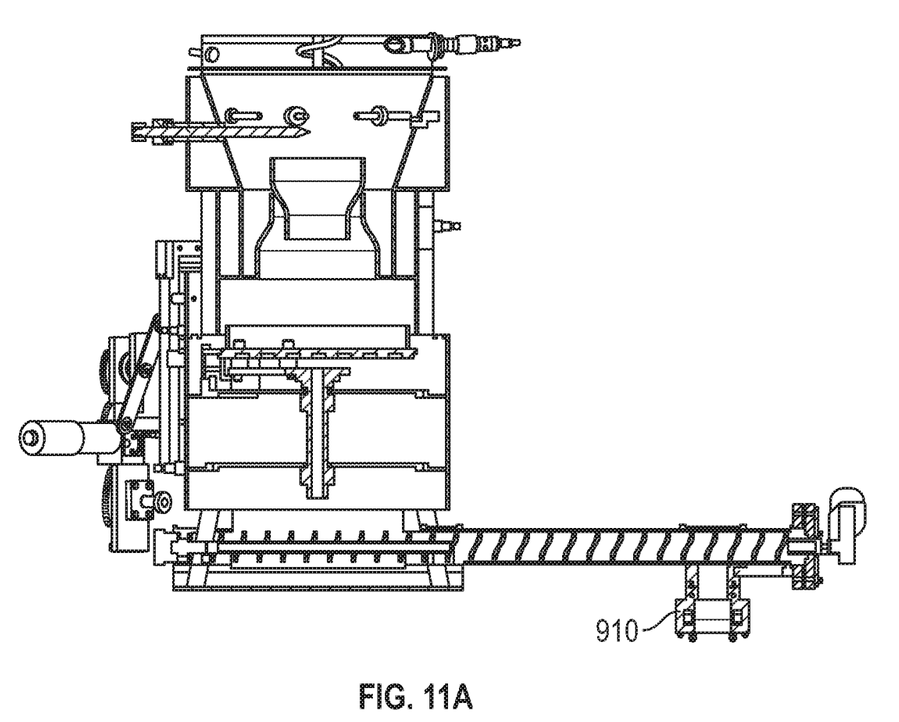
FIGS. 11A and 11B are cross-sectional views illustrating the exit auger along with gate valves that control air inflow to the gasifier and prevent accidental oxidation of char.
Figure 11B:
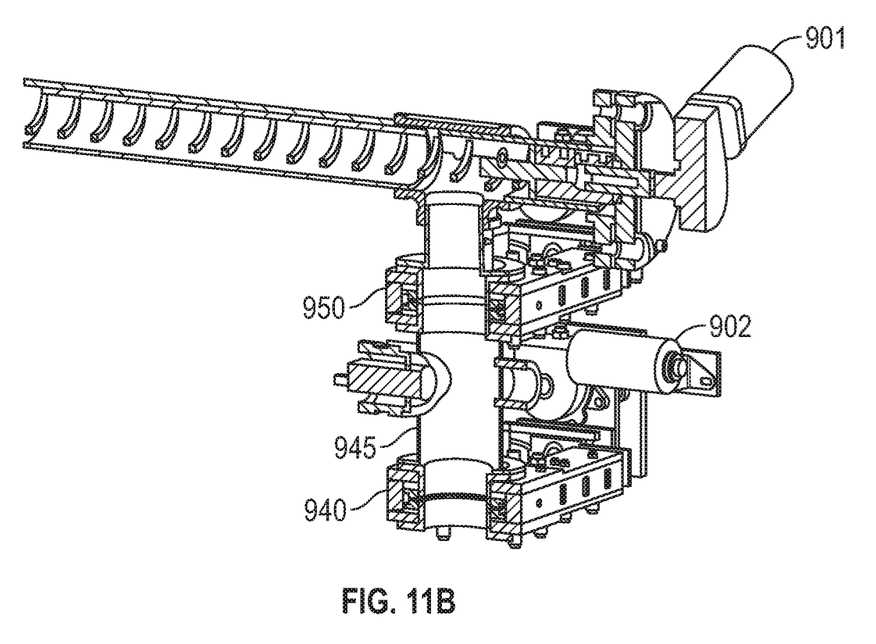

Material exiting the grate assembly drops onto exit auger assembly 260 which conveys the char or ash particles out of the gasifier. Generally, as shown in FIG. 11A, a loadlock such as gate valve 910 is used to exclude oxygen at this stage. If char is produced, it is desirable to include two gates valves, such as valves 940 and 950, as shown in FIG. 11B, whereby a compartment 945 between the two gate valves serves as a holding container and insulates the gasifier from oxygen exposure. The char produced in this manner is made in a hydrogen rich environment, and is suitable for use as high temperature biocarbon fuel as disclosed in U.S. Provisional Application 62/288,605 titled "High Temperature Biocarbon Fuel". The disclosed methods enable the production of a high temperature, high surface area, mechanically stable, long storage life, easily transportable biocarbon solid fuel of comparable energy density to liquid fuels.

The present disclosure also enables a fast start-up in the gasifier with consequent hydrogen production.

One skilled in the art will appreciate that the present disclosure can be practiced by other than the various embodiments and preferred embodiments, which are presented in this description for purposes of illustration and not of limitation, and the present disclosure is limited only by the claims that follow. It is noted that equivalents for the particular embodiments discussed in this description may practice the disclosure as well.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that may be included in the disclosure. The disclosure is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present disclosure. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosure, whether or not such embodiments are described and whether or not such features are presented as being a part of a described embodiment. Thus the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. An automated system for facilitating the flow of solids through a gasifier, comprising:
   a fixed bed gasifier having upright cylindrical walls defining a biomass gasification chamber therein, the gasifier configured to produce synthesis gas and a carbonaceous product and ash;
   a device for metering biomass to the gasifier;
   a device for selectively filtering gasification products;
   a device for impacting the cylindrical walls with a force;
   a device for radially mixing carbon in a reduction zone without vertical displacement of gasifier products, the device comprising a shaft and a flattened wire that spirals around the shaft and is attached to the shaft only at select shaft protrusions, thus leaving significant void space between the shaft and the wire;
   one or more material presence sensors which detect the amount and status of biomass within the gasification chamber;
   an anti-jamming mechanism to automatically clear jams within said gasifier using input from at least one material presence sensor, wherein the anti-jamming mechanism comprises using the input from at least one material presence sensor to pass passing biomass from input reservoir through a loadlock having two gates valves and a compartment between the two gate valves serving as a holding container and insulating the gasifier from oxygen exposure; and
   a processor system which takes input from material presence sensor and activates one or more of said devices.

2. The system of claim 1, in which the device for metering biomass to gasifier is connected to one or more loadlocks.

3. The system of claim 1, in which the device for metering biomass comprises a means for conveying char or ash out of the chamber.

4. The system of claim 1, wherein the material process sensor comprise at least one of the following type of sensors: capacitive, mechanical displacement, optical infrared, ultraviolet, X-ray, microwave, thermal, pressure.

5. They system of claim 1, wherein the device for radially mixing carbon in the reduction zone comprises a retractable shaft connected to an auger with large void volume.

6. The system of claim 1, in which the carbonaceous product is made in a hydrogen rich environment.

7. The system of claim 1, wherein the carbonaceous product comprises a biochar pellet which is mechanically strong.

* * * * *